United States Patent
Yenne et al.

(10) Patent No.: US 7,058,927 B2
(45) Date of Patent: Jun. 6, 2006

(54) COMPUTER SOFTWARE RUN-TIME ANALYSIS SYSTEMS AND METHODS

(75) Inventors: Britt Yenne, Lindale, TX (US); Dave Burton, Austin, TX (US)

(73) Assignee: VERITAS Operating Corporation, Mountain View, CA (US)

( * ) Notice: Subject to any disclaimer, the term of this patent is extended or adjusted under 35 U.S.C. 154(b) by 609 days.

(21) Appl. No.: 10/014,107

(22) Filed: Dec. 10, 2001

(65) Prior Publication Data

US 2002/0138788 A1 Sep. 26, 2002

Related U.S. Application Data

(60) Provisional application No. 60/257,671, filed on Dec. 21, 2000.

(51) Int. Cl.
*G06F 9/44* (2006.01)

(52) U.S. Cl. .......................................... 717/128; 714/38
(58) Field of Classification Search ......... 717/124–135; 714/34, 35, 37, 38, 48
See application file for complete search history.

(56) References Cited

U.S. PATENT DOCUMENTS

| | | | |
|---|---|---|---|
| 5,729,676 A | 3/1998 | Inoue | 714/38 |
| 5,842,017 A | 11/1998 | Hookway et al. | 717/158 |
| 5,968,188 A | 10/1999 | Rana | 714/29 |
| 6,085,029 A * | 7/2000 | Kolawa et al. | 714/38 |
| 6,164,841 A * | 12/2000 | Mattson, Jr. et al. | 716/1 |
| 6,202,199 B1 * | 3/2001 | Wygodny et al. | 717/125 |
| 6,249,907 B1 * | 6/2001 | Carter et al. | 717/129 |
| 6,311,327 B1 * | 10/2001 | O'Brien et al. | 717/114 |
| 6,381,735 B1 * | 4/2002 | Hunt | 717/158 |
| 6,499,137 B1 * | 12/2002 | Hunt | 717/164 |

* cited by examiner

*Primary Examiner*—Antony Nguyen-Ba
(74) *Attorney, Agent, or Firm*—Meyertons Hood Kivlin Kowert & Goetzel, P.C.; B. Noël Kivlin (57) ABSTRACT

A system for run-time analysis of software programs using traces comprises a software program including two or more trace points, a trace control channel, a trace channel and a runtime tracer. The trace control channel includes an identification of one or more selected trace points of the two or more trace points. The runtime tracer is configured to concurrently execute a first and a second instance of the software program. Each instance of the first and second instances is configured to interact with the trace control channel to save trace information corresponding to the one or more selected trace points in the trace channel.

26 Claims, 8 Drawing Sheets

Fig. 10 ns and Methods

COMPUTER SOFTWARE RUN-TIME ANALYSIS SYSTEMS AND METHODS

CROSS-REFERENCE TO RELATED APPLICATION

This application claims the benefit of U.S. Provisional Patent Application No. 60/257,671 titled "Computer Software Run-Time Analysis Systems and Methods", filed Dec. 21, 2000, co-pending herewith and which is hereby incorporated herein by this reference.

BACKGROUND OF THE INVENTION

The present invention generally relates to computers and software operating on computers and, more particularly, relates to systems and methods for tracing, including recording and analyzing, the execution of software programs in real-time, dynamic and run-time operations.

Software debugging is critical for proper operations of software. Debugging is typically a complex task, particularly in complex, multi-threaded, and distributed software program applications. Conventional debugging tools, such as debugger programs included with software compilers and others, are generally not adequate for debugging in many such instances. Moreover, run-time failures of software are often not easily analyzed and detected with enough specificity to allow bug detection and ascertainment with any specificity.

Software bugs fall into at least three different types or classes of errors. These types of bugs include: syntax errors, logical errors, and algorithmic error. Ralston, A. and Reilly, E., *Encyclopedia of Computer Science, Third Ed.*, p.419. Although all of these types of bugs can be complex and hard to detect and fix, logical errors and algorithmic errors can be the most difficult. Conventional debugger software, sometimes referred to as symbolic debuggers and often supplied with compiler programs, is generally helpful with detecting and identifying points at which an executing program halts prematurely or emits wrong answers because of bugs. These conventional debuggers are used primarily by the program developer during software development and testing.

Debugging is typically a time consuming step in software development which is undertaken prior to wide release or use of the program. The aim in debugging with conventional debug tools has been to detect and remedy errors before software has been distributed to end-users for use in applications. Generally, bugs uncovered in release versions of programs are not remediable by the end-user of the program, particularly in software distributed only in object code or other run-time versions. Developers have relied on reproducing reported bugs in the lab and on end-user descriptions and explanations of bug incidences in order to understand and fix the bugs.

Run-time versions of software programs, such as compiled and executable object code applications, have typically been equipped to provide only minimal run-time failure messages and identifiers. For example, a run-time fault in a common application program usually yields only an "error" or "exception" message that can, but does not necessarily, also include a classifier or indicator of the source or location at which the fault results. These messages produced on fault of the typical run-time application are often not very helpful to the user or developer to analyze and determine the source of or reason for the fault. The error messages merely indicate the point of the program at which the fault or bug causes the entire program to cease operations. This point may or may not be the true source of the bug or other fault, and it is often problematic and cumbersome to attempt to trace back through software code to determine the true source from the limited knowledge afforded by the run-time error message.

The various mechanisms and procedures employed in the past to detect, analyze and remedy bugs in software programs have typically been employed only in the program development process. Debugging is not usually performed in distributed, run-time versions of programs, although debug information beyond the minimal run-time error messages, previously described, could be helpful to isolate and fix bugs that inevitably occur even in release and later versions of software applications. One reason that only the minimal run-time error messages have been included in run-time versions of programs has been the desire for speedy and efficient operations of those programs. Conventional debugger tools are typically complex and computing- and time-intensive to operate, and do not lend themselves to ready operation in run-time circumstances. Nonetheless, more extensive and comprehensive debug information could be helpful to remedy bugs in run-time software, if these problems of conventional debuggers are overcome.

Moreover, prior debugging tools have not allowed on-the-fly choice among debug information from the debug steps during run-time execution of program software code being debugged. Conventional debugging tools are cumbersome and time-consuming to execute, therefore, run-time debugging has not been feasible in view of performance impacts to executing programs. Any run-time debugging has been very limited in capability and use, because of these and other problems.

It would be a significant improvement in the art and technology to provide debugging tools and capabilities to production software code, if the impact of those tools and capabilities does not impact or only negligibly impacts run-time performance or operation of the code.

SUMMARY OF THE INVENTION

An embodiment of the invention is a pre-processor for processing a program that includes at least one function call. The pre-processor includes a code expander for detecting the at least one function call of the program, at least one trace hook call, and an inserter, communicably connected with the code expander and the at least one trace hook call, for inserting the at least one trace hook call in the program relative to the at least one function call.

Another embodiment of the invention is a method of pre-processing a program that includes at least one function call. The method includes detecting the at least one function call of the program and associating at least one trace hook call with the at least one function call.

Yet another embodiment of the invention is a run-time tracer. The run-time tracer includes a data processor, a memory communicatively connected to the data processor, a software program operating on the data processor, having at least one trace hook call associated with at least one function call of the program, and a trace id stored in the memory, that identifies the at least one trace hook call, associated with the at least one function call of the program.

Another embodiment of the invention is a shared memory for run-time tracing. The shared memory is communicatively connected to a dedicated memory. An executable program includes a function call to a function routine. The embodiment also includes a trace id corresponding to and identifying the function call. An address of the shared memory corresponds to an offset of an address of the dedicated memory. A state at the address of the shared memory is the same as a state at the address of the dedicated memory.

A further embodiment of the invention is a method of run-time tracing. The method includes processing a data, storing the data in a first memory, programming the step of processing to perform a function routine, so that at least one trace hook call is associated with at least one function call of the function routine, and storing a trace id in a second memory, the trace id serving to identify the at least one trace hook call.

Another embodiment of the invention is a method of sharing memory for run-time tracing. The method includes executing a program. The program includes a function call to a function routine and a trace id corresponding to and identifying the function call. The method also includes addressing the shared memory at an offset of an address of a dedicated memory and replicating a state of the dedicated memory in the shared memory as dictated by the step of addressing.

BRIEF DESCRIPTION OF THE DRAWINGS

The present invention is illustrated by way of example and not limitation in the accompanying figures, in which like references indicate similar elements, and in which.

DETAILED DESCRIPTION OF PREFERRED EMBODIMENTS

Tracer Development

Figure 1:
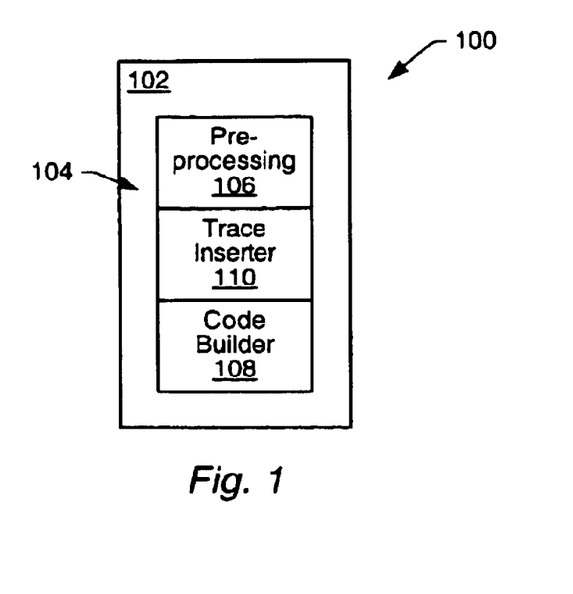
FIG. 1 illustrates a computer for creating an executable compiled program for run-time tracing, including a trace inserter for incorporating trace points in a code of the program and in the executable compiled program, according to embodiments of the present invention.

Referring to FIG. 1, a tracer development system 100 includes a computer 102. The computer 102 is, for example, a personal, laptop, workstation, or mainframe computer, a personal digital assistant, or other data processing device having a central processing unit (CPU) and memory access, and includes a trace compiler 104. The trace compiler 104 is any hardware, software, or combination that is included in, or otherwise communicably connected to or operable by, the computer 102 to "compile" software code for run-time trace operations as described herein. As used herein, the terms "compile" and "compiler" have their typical meanings of a process and special computer program that processes statements written in a particular programming language (e.g., source code) and turns them into machine language (e.g., object code) that a computer's processor uses to process the compiled software application. As will be detailed more fully, the tracer development system 100 includes the trace compiler 104, which has functions of the conventional compiler of pre-process parsing and object code building and linking, and additionally has the function of inserting trace points in the code for run-time trace operations.

More particularly, the trace compiler 104 includes a pre-processor 106, a trace inserter 110 and a code builder 108. The pre-processor 106 serves to first parse (i.e., analyze) all of the language statements, written in the particular programming language, syntactically, one after the other. The code builder 108, in one or more successive stages (or "passes), builds output code that is the object code which a computer's processor can process in running the software application so compiled. The builder 108 makes certain that statements that refer to other statements within the compiled software application are referenced correctly in the final output object code from the trace compiler 104. In correctly referencing the statements in this manner, the code builder 108 of the trace compiler 104 typically creates or invokes one or more look-up tables or databases which include the appropriate cross-referencing among the language statements of the program and which enable expedient and logical operations of the program in the form of the output object code. The code builder 108 can also include, as is conventional, a linker that collects intermediate object files into a unitary binary file, resolving outstanding symbol references, and possibly also incorporating special startup code or external libraries.

The trace inserter 110 of the trace compiler 104 is communicably connected with the pre-processor 106 and the code builder 108 of the trace compiler 104, and is also included in, or otherwise communicably connected to or operable by, the computer 102, as are the other elements of the trace compiler 104. The trace inserter 110 is a software, hardware or combination that pre-processes a language statement program (i.e., source code) to expand the code of the program at function entry and exit commands and points, and then inserts in the pre-processed language statement program various trace points. The trace points, as hereinafter more filly described, serve to track, identify, analyze and report occurrences during running of the object code output version of the software program from the trace compiler 104. Because of the unique and inventive embodiments herein, there is not any performance or operational impact on the software during compilation with inserted trace points. Moreover, there is not any, or merely negligible, impact on the software run-time performance and operation.

Figure 2:
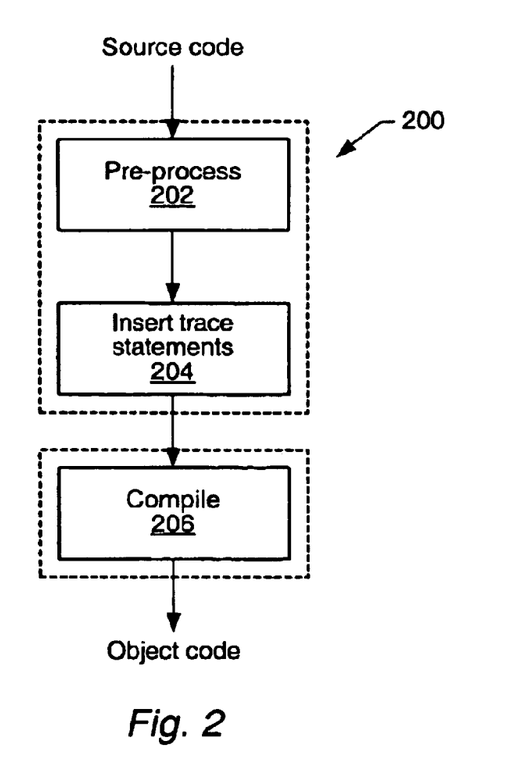
FIG. 2 illustrates a method of creating the executable compiled program via the computer of FIG. 1, according to embodiments of the present invention.

Referring to FIG. 2, a method 200 is performed by the trace compiler 104 on the computer 100. In a step 202, a programming language software program is pre-processed. The pre-process step 202 is a parse of the programming language software program to expand the program to determine function entry and exit calls and commands. At each entry and exit call and command, one or more trace points is inserted in the program in a step 204. The trace inserter 110 of FIG. 1 performs the steps 202, 204. Additionally, the trace inserter 110 can allow a user to manually input trace points in the result from the pre-process step 202, as appropriate or desired by the user.

After the steps 202, 204, the method 200 concludes with a compile procedure in a step 206. The compile step 206 includes parse and build procedures, substantially in accordance with conventional compiler operations of the pre-processor 106 and the code builder 108 of FIG. 1. In effect, the resulting object code output from the method 200 is a compiled version of the input source code, but which source code also includes trace points as inserted in the steps 202, 204 and compiled in the step 206 together with and as inserted in the input source code. Run-Time TracerReferring to FIG. 3, a run-time trace system 300 includes a computer 302. The computer 302 is, for example, a personal, laptop, workstation, or mainframe computer, a personal digital assistant, or other data processing device having a central processing unit (CPU) and memory access. The computer 302 can be the same computer 102 of FIG. 1, or some other computer or processing device capable of executing the object code output from the system 100 of FIG. 1 and the method 200 of FIG. 2.

Figure 3:
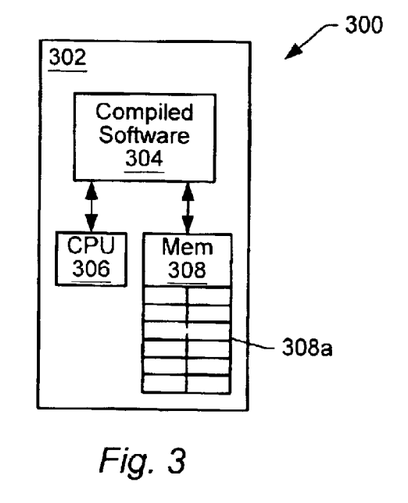
FIG. 3 illustrates a computer for executing the executable compiled program and thereby performing the run-time tracing, according to embodiments of the present invention.

The computer 302 includes a central processing unit (CPU) 306 and memory 308. The CPU 306 is communicably connected to the memory 308. Additionally, the computer 302 includes a compiled software application 304, which compiled software application 304 includes trace points inserted by the trace inserter 110 of FIG. 1 according to the method 200 of FIG. 2. The compiled software application 304 can be implemented in software, hardware, or combinations, and can perform any of a wide variety and assortment of functions and applications as is commonly available. For example, the software application 304 can be any application performable via the computer 302, such as an operating system, an application, a communication feature, a control or driver function, a network manager or enabler, or other. The application 304 is any available software, now or in the future, that is employed in a run-time environment and in which a tracing mechanism is useful to assess and fix faults.

Figure 4:
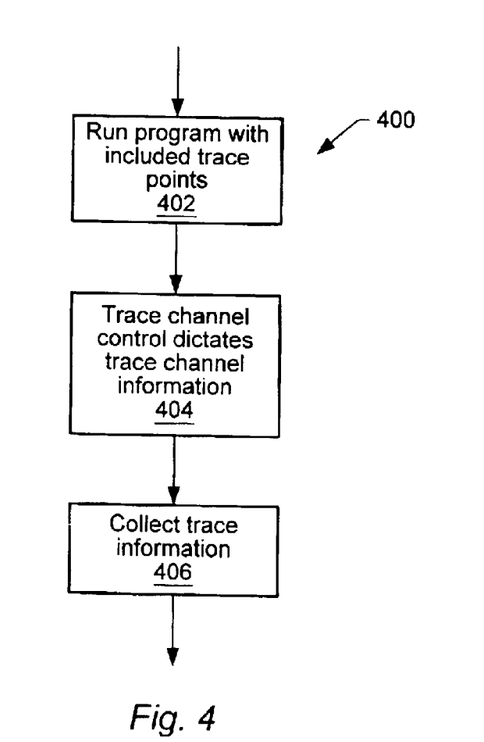
FIG. 4 illustrates a method of executing the executable compiled program via the computer of FIG. 3, according to embodiments of the present invention.

Referring to FIG. 4, a method 400 is performed on a computer or other processing device, such as the computer 302 of FIG. 3, in running an application program that includes trace points and tracing capabilities, as configured and described above. In the method 400, a step 402 executes the application program having the incorporated trace points. The application program so executed in the step 402 is a run-time version, such as object code, of the application program with included trace points and having been compiled as described above.

In a step 404 of the method 400, the application program being run in the step 402 interacts with a trace control channel (later herein identified as 708 of FIG. 7) which dictates particular trace information as a trace channel (also later herein identified as 706 of FIG. 7). This interaction in the step 404 is initiated in conjunction with the running of the application program, and can be dynamically defined or set on-the-fly manually by the computer operator, automatically by pre-set settings, or otherwise dynamically during or prior to program execution in the step 402. The interaction and dictation of trace information in the step 404 enables detection of occurrences and gathering of trace information during program execution with respect to the trace points in the program and as dictated by settings for tracing. The trace information gathered as a result of the step 404 is then collected for reporting in a step 406. The collecting step 406 provides trace information in formats suitable to be output to or by the computer running the application program or otherwise, for reporting or other purposes.

As has been generally described, the trace points incorporated in run-time versions of application programs provide trace information, in real time during program execution, without significant impact or effect on program performance, including veracity and timing of program execution.

Trace ID Database Creation and Update

Figure 5:
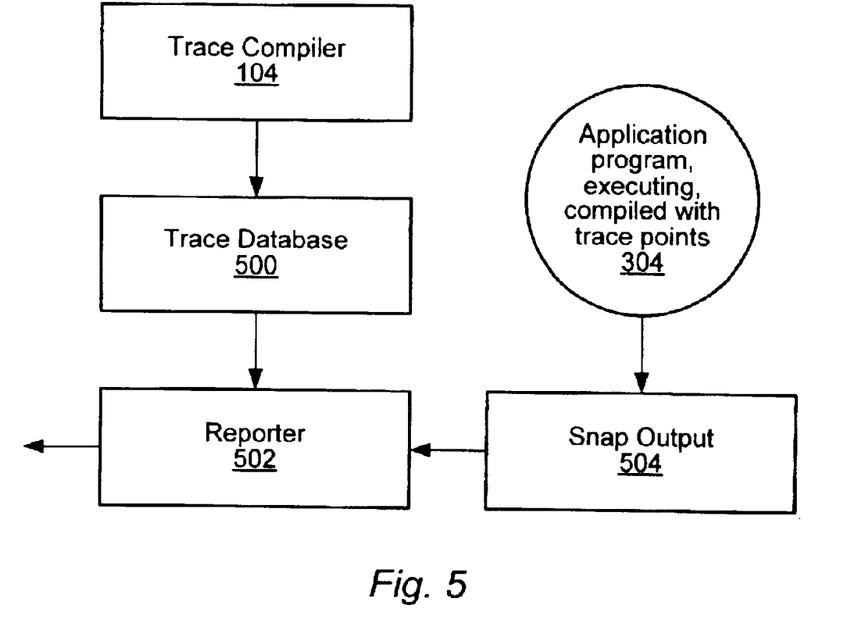
FIG. 5 illustrates a system including a trace database operating in conjunction with a trace compiler, a snap output, and a reporter, for reporting of trace information obtained in run-time execution of an executable compiled program having trace points, according to embodiments of the present invention.

Referring to FIG. 5, during the trace compile procedure of the method 200 of FIG. 2, a trace database 500 is created. The trace database 500 comprises unique trace identifiers (id) associated with each distinct trace point of the compiled code. The trace database 500 is a relational database that relates the unique trace ids with the particular trace points, and also includes relevant interpretive information regarding occurrences at trace points of the code during run-time execution. As shown in FIG. 5, the trace database 500 communicates with a reporter 502 and a snap output 504 of run-time occurrences at the trace points of the code, in order to relate appropriate trace identification and interpretive information of the database 500 uniquely to each of the trace points then included in the snap detection and the occurrences then encountered at the trace points at the instant of the snap detection.

Figure 6:
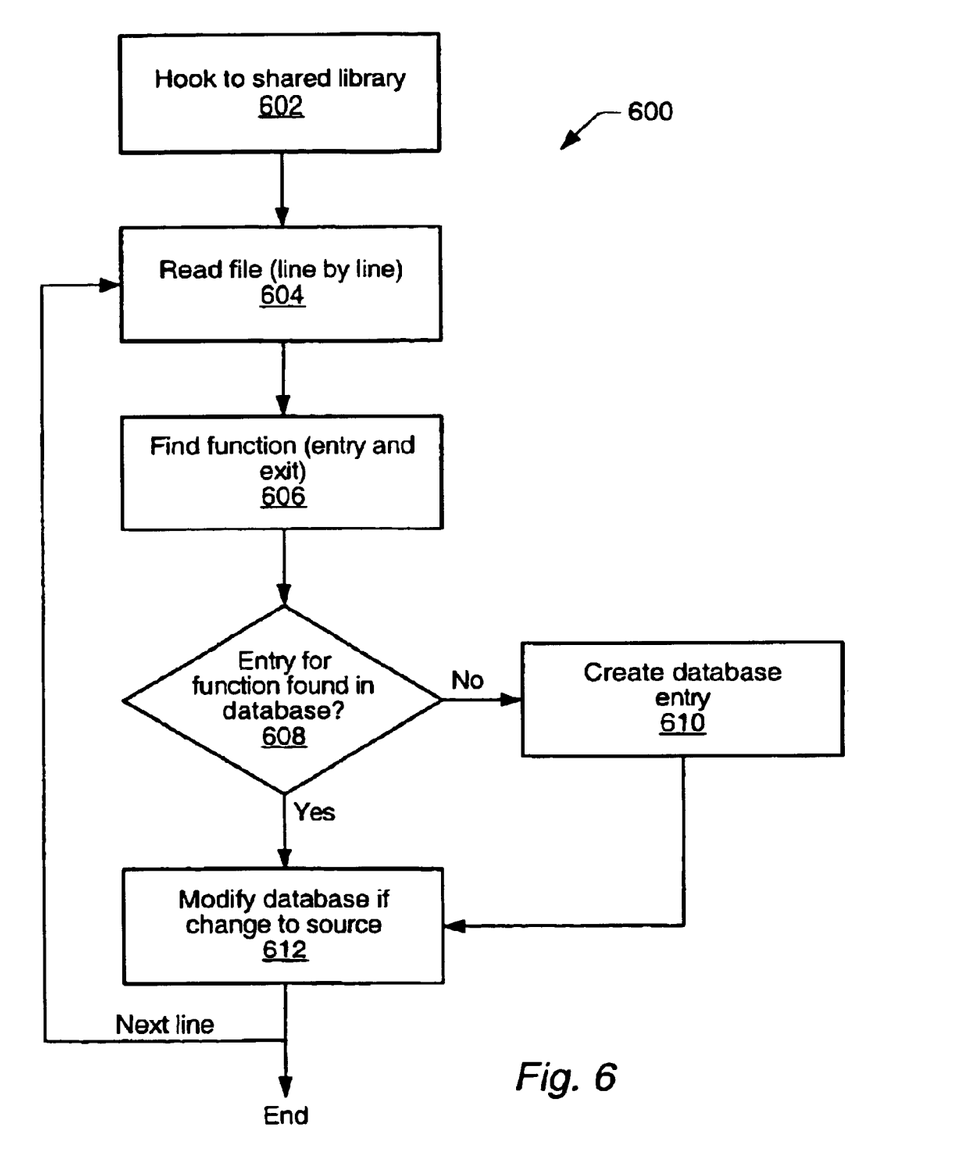
FIG. 6 illustrates a method of creating a trace database of trace information, including trace identifiers (id's) corresponding to trace points of an executable compiled program, the trace points invoke function routines of the code language of the program, according to embodiments of the present invention.

The snap output 504 is collected via the running of the compiled application program 304 of FIG. 3. As later described, a trace control channel 708 (shown in FIG. 7) associated in a shared memory 704 (shown in FIG. 7) with the running of the compiled program 304 and the snap output 504 dictates the particular trace points for which trace information is collected in the run. For purposes of operations of the trace database 500, once the trace information from the running of the compiled program 304 is collected according to the particular control channel 708, a snap (or capture) of trace point occurrences information is obtained for any select instance. The snap output 504 from the snap is, via the trace database 500, associated by virtue of the trace ids corresponding to the trace points, with trace identification and interpretive information for the database 500. In this manner, the database 500 together with the output reporter 502 provides readable and understandable trace information for the applicable trace points. The trace information, in such form, is made available from the system by the reporter 502, such as, for example, a printer or display. The reporter 502, for example, provides the useable trace information in text, HTML, or other format. Referring to FIG. 6, the pre-processed code with inserted trace points in the steps 202, 204 of the method 200 of FIG. 2 is further processed in a method 600, prior to the step of compilation 206 of FIG. 2, in order to create the trace database 500 of trace ids (i.e., trace identifiers) and interpretive information.

In the method 600, the pre-processed code with inserted trace points is hooked to a shared library of function calls in a step 602. The hook to the shared library is achieved via the insertion of a hook or other coded call at a first line of the code. The hook is inserted, for example, along with insertions of the trace points in the steps 202, 204. The shared library is the conventional collection of library routines of the standard compiler for the particular source language of the application software, for example, C++ or other language. As is common, each function call appropriate to the particular source language of the program has a corresponding library routine that executes the function. The shared library is the source of the routines corresponding to the function calls of the program.

The method 600 then proceeds with a step 604 in which a next line of the code (i.e., the pre-processed code with inserted trace points) is read. In a step 606, the line of code is assessed to determine if the line includes a function call. A look-up operation is then performed in a step 608 for the function corresponding to the function call. The look-up is performed in trace database 500 of FIG. 5 created by the method 600. The trace database 500 associates a unique identifier (i.e., trace id) with each trace point within the code. If the method 600 has previously been performed for the code or a predecessor version of the code, then an existing entry in a trace database 500 could be available. Otherwise, the function will not be found in an existing entry in a trace database 500, and the method 600 proceeds to a step 610 of creating a new entry in a trace database 500. If there is any existing entry in a trace database 500 of the code or predecessor versions which includes the function corresponding to the particular function call, then a step 612 modified by adding to the trace database 500 if there has been any change to the source code then being handled by the method 600.

Upon creation of the trace database 500, or otherwise after any applicable modification by adding to the trace database 500 because of changes to the source of the currently handled code, the method 600 returns to the step 604. Repetition of the steps 604, 606, 608, 612 continues until all lines of the code have been processed in the method 600.

Shared Memory

Figure 7:
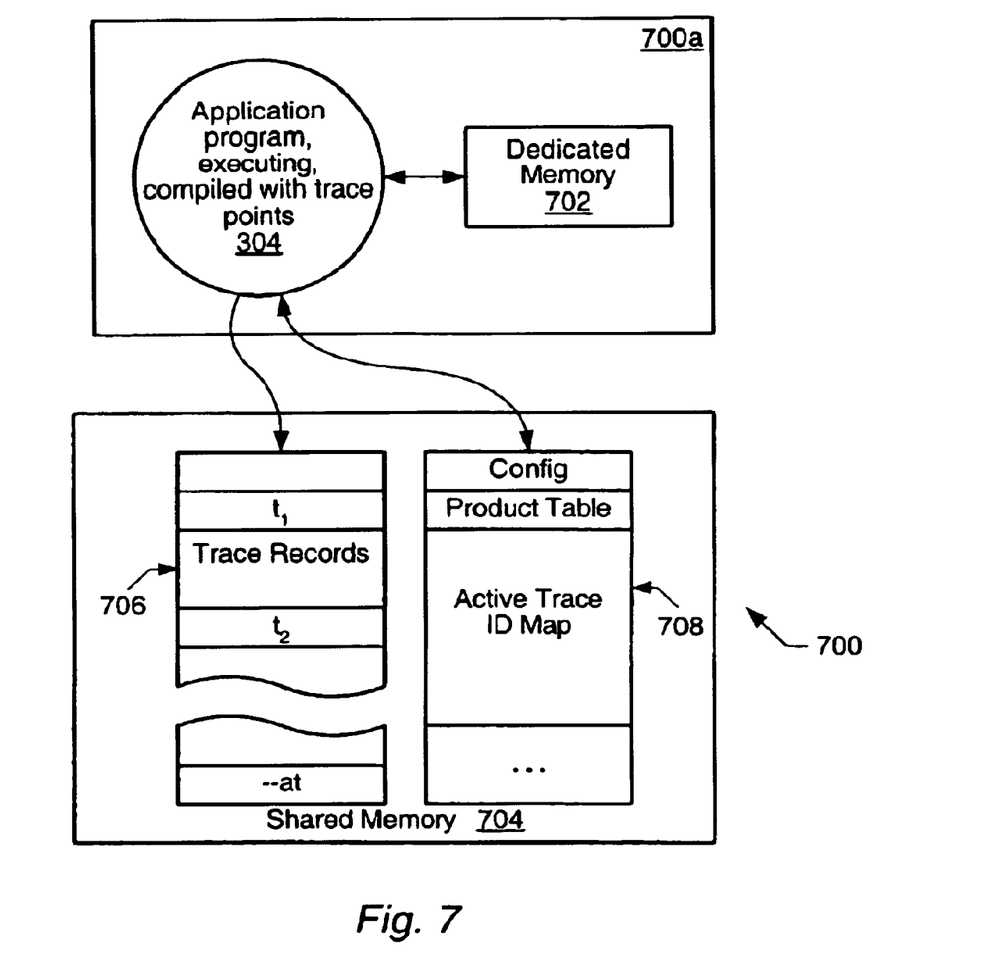
FIG. 7 illustrates a run-time memory, including a dedicated memory and a shared memory, accessible by the executable compiled program of FIG. 3 in the method of FIG. 4, for capturing trace information during run-time of the program, according to embodiments of the present invention.

Referring to FIG. 7, a run-time memory 700 for executing the compiled application program 304 (also shown in FIG. 3) and collecting trace information, includes one or more sources of a random access memory (RAM) or other memory of a computing device. The run-time memory 700 comprises two types of memory used in executing a run-time trace according to the embodiments here; these are a a dedicated memory 702 and a shared memory 704. In running of the compiled program 304 of FIG. 3, according to the method 400 of FIG. 4, as each successive trace point of the compiled program 304 is encountered, a routine executes in a library maintained in the dedicated memory 702. The routine writes a record of the trace encounter into the shared memory 704. For example purposes, the dedicated memory 702 and compiled program 304 are illustrated in FIG. 7 as occurring at a unique element or location indicated by the box 700a and the shared memory 704 is illustrated as a separate unique element or location, as can be the case where the compiled program 304 and dedicated memory 702 are included in a user computer connected to a network on which resides the shared memory 704. Although illustrated for example purposes in this manner, the location and configuration of any number and arrangement of computing devices, connections, and memory is possible in keeping with the scope herein.

Continuing to refer to FIG. 7, the dedicated memory 702 is employed in operations of the application program 304, and can include libraries and other routines and elements required in operation of the application program 304. In execution of the application program 304 in this environment, the program 304 will encounter the trace points compiled within the program 304. As each trace point is encountered, a routine in the libraries of the dedicated memory 702 causes records related to occurrences of the encounter to be written into a trace channel 706 of the shared memory 704.

If more than one application program 304 is in execution, and even if different versions of the application program 304 are being concurrently run, the application program 304, and each of them, interacts with the shared memory 704 to write to the same trace channel 706 of the shared memory 704 in similar fashion. The particular trace points for which detections and occurrences are written to the trace channel 706 of the shared memory 704 at each instant is dictated by a trace control channel 708 also contained in the shared memory 704. The trace control channel 708 can be set or varied, on the fly and otherwise, during run-time or otherwise, in order to obtain desired trace records in the trace channel 706. Because the trace control channel 708 and the trace channel 706 are each maintained in shared memory 704, all run-time occurrences of the compiled program 304 use and interact with the same information of the shared memory 704. Thus, at any instant, regardless the versions and number of independent executions of the compiled program 304, the trace channel 706 is dictated by the trace control channel 708 and the information of the trace channel 706 is the information then dictated by the state of the trace control channel 708.

Figure 8:
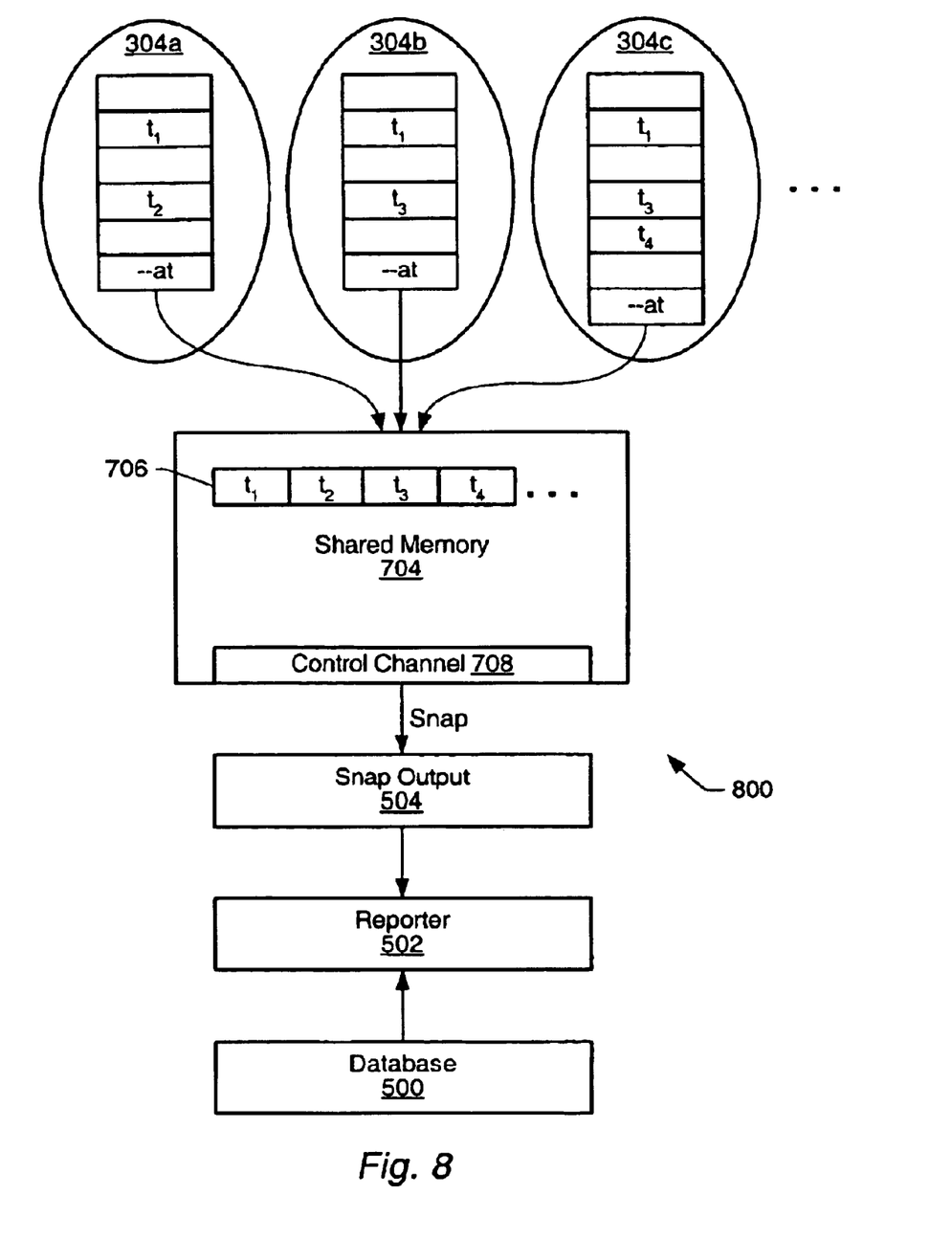
FIG. 8 illustrates the memory of FIG. 7, wherein there are multiple instances of run-time execution of the executable compiled program, and the operations therewith of the memory, both the dedicated memory and the shared memory, according to embodiments of the present invention.

Referring to FIG. 8, an exemplary run-time operation 800 of the shared memory 704 of FIG. 7 is illustrated. In the operation 800, three instances of the compiled program 304 are concurrently running or in other manner overlap in execution. The three instances generate trace information respectively illustrated as the information 304a, 304b, 304c. The three instances of the information 304a, 304b, 304c are trace information relevant to trace points encountered and dictated by the trace control channel 708 of the shared memory 704 at the instant of the encounter. The trace information 304a, 304b, 304c are respectively written to the shared memory 704 as the trace channel 704. The writing of the trace information 304a, 304b, 304c, including its instance and occurrence for each trace point of each of the three instances of execution of the compiled program 304 evidenced by the information 304a, 304b, 304c, is dictated by the control channel 708 at the instant of the writing.

At any point in time, the trace channel 706 can be snapped (i.e., the information of the channel 706 captured or collected), providing the snap output 504 (also shown in FIG. 5). As previously described with respect to FIG. 5, the snap output 504 is associated with information in the trace database 500 set up, saved, and modified by additions at compilation of the compiled program 304 (and each respective compilation thereof, including all different version of the program 304). As so associated, the reporter 502 delivers or makes available useable information regarding the trace points (because of corresponding trace ids of the database 500) and occurrences thereat, for every instance of the information 304a, 304b, 304c, as well as all others.

Trace Channel

Figure 9:
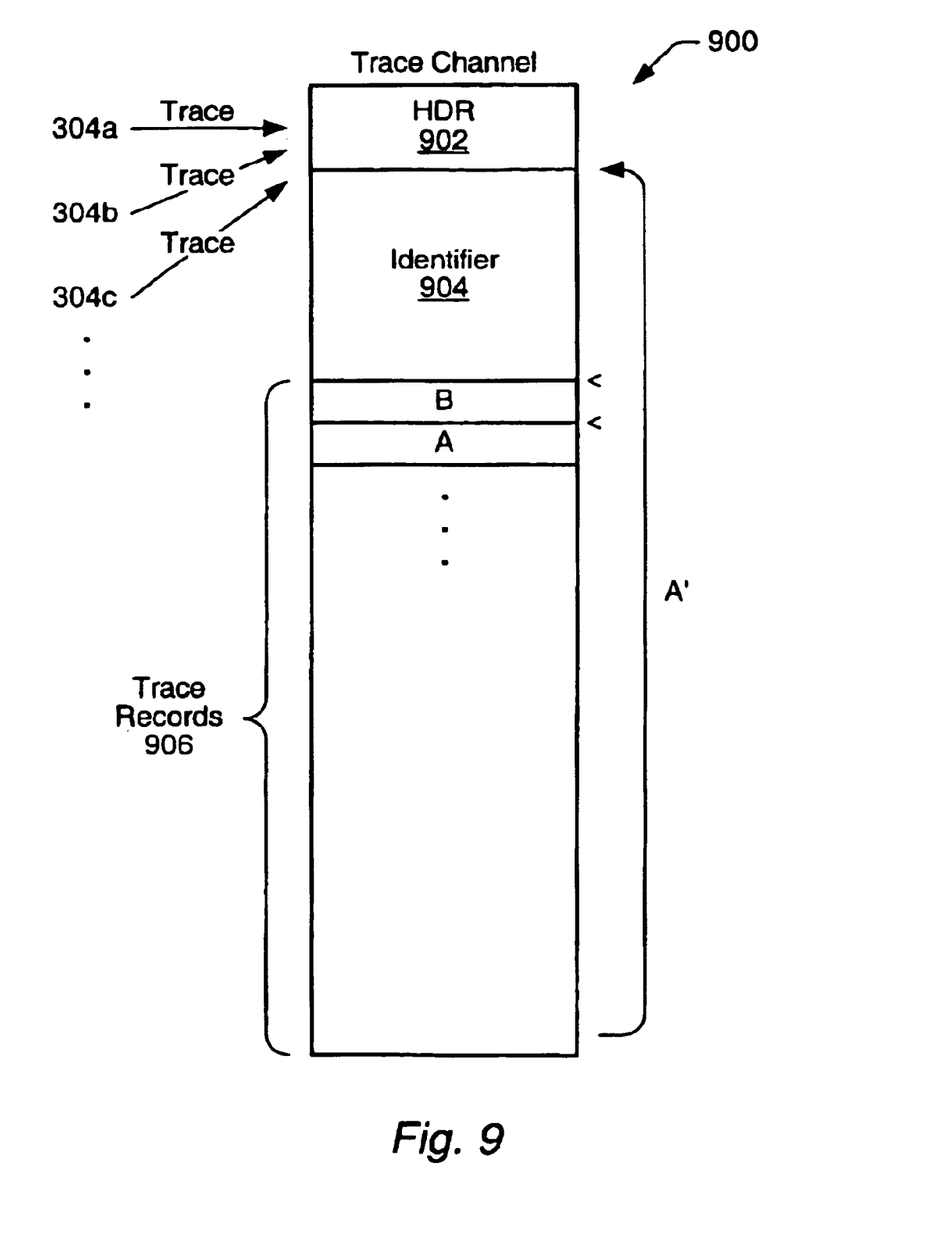
FIG. 9 illustrates a trace channel of a shared memory for run-time tracing during execution of an executable compiled program, configured as a circular buffer allowing overwrite of entries of the channel in a first in, first out arrangement, according to embodiments of the present invention.

Referring to FIG. 9, the information of the trace channel 706 at any instant is limited, because to not limit the information could result in too much information (e.g., dating back for all time, etc.) and memory overflows. The trace channel 706 can therefore be configured as a circular trace channel 900. The circular trace channel 900 is a circular buffer or memory, in which the channel 900 includes a header 902, an identifier 904, and one or more trace records 906, which are successively replaced in an overwrite operation when the buffer is fall.

The circular trace channel 900, such as a buffer, cache or other similar memory or storage source, serves to hold trace information related to trace points which are dictated for tracing (by virtue of the state of the control channel 708 of FIG. 7) in any particular run of the application program 304 from the method 400 of FIG. 4. The information 304a, 304b, 304c for each run of the program 304 is collected for each trace point as dictated by the control channel 708. Each trace point, of course, has a trace id of the trace database 500, which also corresponds to the data maintained in the trace database 500 (shown in FIGS. 5 and 6). From the database 500, respective information 304a, 304b, 304c contained in the trace channel 706 at an instant of a snap of the channel 706 can be reported in useable format. For example, for each trace point traced and reported in any run of the application program 304, the trace channel 900 includes certain formatting headers, the applicable trace points encountered and related to corresponding trace ids of the database 500, and applicable trace related records, such as, for example, values, occurrences, and states for the particular function call corresponding to the trace point.

An exemplary format of the trace channel 900 in FIG. 9 includes a header 902, an identifier 904, and one or more trace records 906. In running of the application program, the trace channel 900 is captured and maintained, for example, in the buffer, cache or similar memory previously mentioned. For each such capture as the trace channel 900, the information of the trace channel 900 is available for reporting, assessment, analysis, manipulation, or other data processing effort. Elements of a computing device which store or can otherwise access the trace channel 900, for example, the trace database 500 and the output reporter 502, can report the trace channel 900 information in formats, reports and other manners and displays desired by a user or other source, according to conventional interface programming and selections.

Continuing to refer to FIG. 9, implementation of the trace channel 900 as a circular buffer is indicated by arrow A'. Such circular buffer arrangement of the trace channel 900 operates to maintain trace records 906 of the trace channel 900 for only so long during program execution as the buffer is not full. In the arrangement, the buffer size is set, for example, the buffer size can be variable but would be set and fixed for any particular run. The buffer which servers as the trace channel 900 can, then, on execution of the application program, capture and maintain the header 902 and identifier 904, and also capture and maintain trace records 906 corresponding to various trace points (e.g., the information 304a, 304b, 304c of FIG. 8, and so forth) until the buffer is filled. Once the buffer for the trace channel 900 is filled, next trace records 906 captured as the trace channel 900 begin to overwrite prior trace records, in a "first in first out" or other desired sequence.

The trace channel 900, together with the control channel 708 and use of the shared memory 704, permit on the fly choice or selection among trace points and trace information captured and available in runs of the application program 304. This is the case because the trace channel 900, operating as an independent storage source for trace records 906 gathered at run-time, will reflect choices dictated by the control channel 708 at each instance for the particular trace points and information which is the trace records 906.

System Schema

Figure 10:
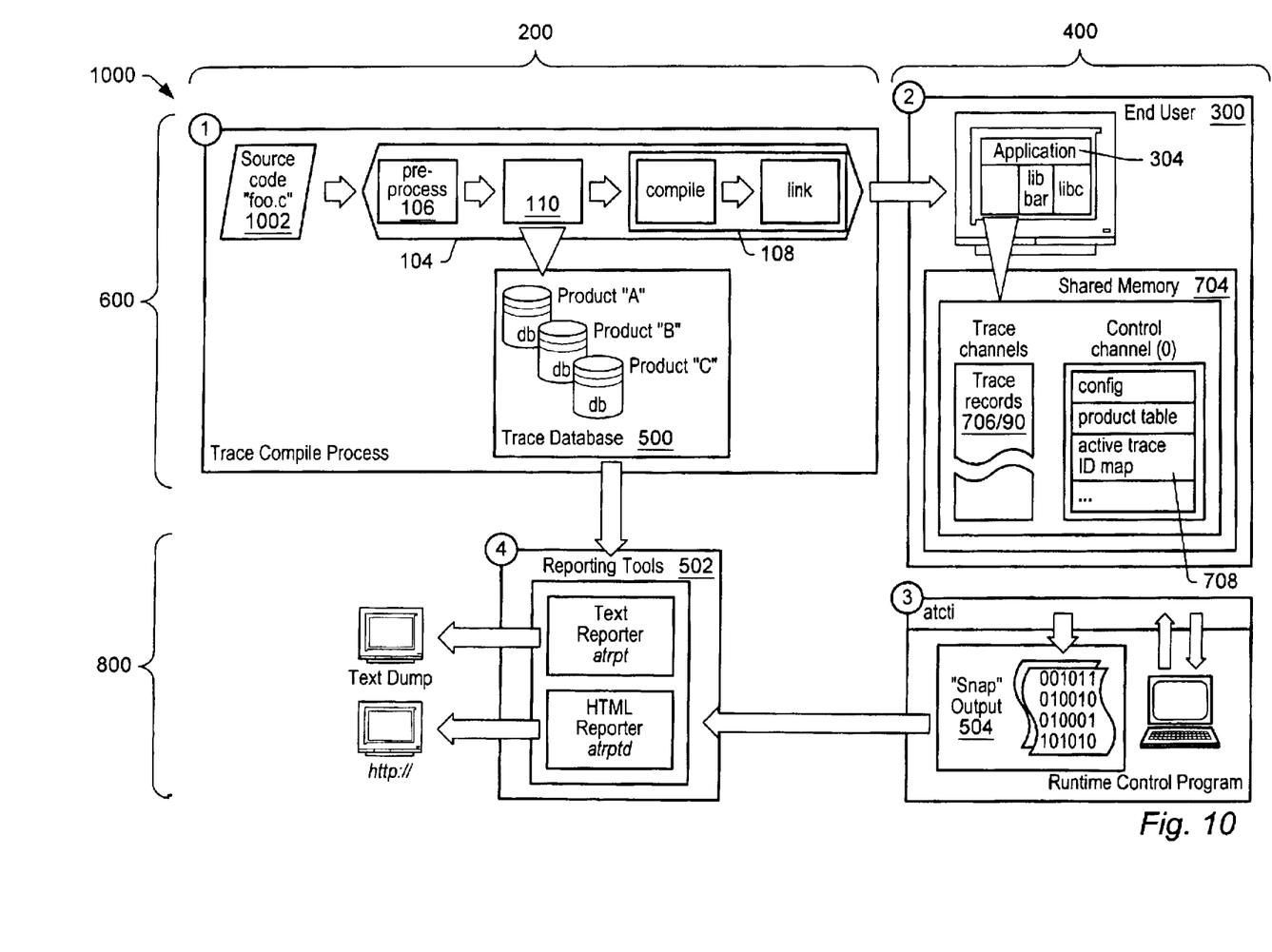
FIG. 10 illustrates a tracing system, including trace compile, trace database, compiled program execution, runtime trace control, trace channel sharing, snap of trace channel contents, and reporting of trace ids and trace information of occurrences at run-time via interrelatedness of the trace database and shared memory, according to embodiments of the present invention.

Referring to FIG. 10, a tracing system 1000, together with shared memory 704, employed in execution of the application program 304 compiled and executed in the methods 200, 400, 500 of FIGS. 2, 4 and 5, respectively, is conceptually illustrated. The conceptual illustration of the system 1000 is helpful to explain the relationships of the trace compile method 200, the run-time trace method 400, the trace database creation method 600, and the shared memory and snap output method 800. Although only a single instance of the application program 304 is executing on a single end-user computer 300 in the example, multiple instances of the execution of the application program 304, on the same or any other communicably connected processing devices, can concurrently and in real time occur according to the system 1000 and the methods 200, 400, 600, 800.

A source code program 10002, for example a C++ language software program or other compilable program, including, without limitation, a run-time compilable program, is compiled by the trace compiler 104. As previously described, the trace compiler 104 includes the preprocessor 106, the trace inserter 110 for inserting trace points at function entry and exit points of the code, and the code builder 108 (which can include compiling and linking functions). Also as previously described, the trace inserter 110 performs the trace database creation or modification method 600, by building or adding to the trace database 500 so that the database 500 includes trace ids corresponding to trace points of the code and also relevant information that corresponds to occurrences encountered at trace points during code execution in order to derive useable trace information.

The compiled program 304 from the trace compiler 104 is run on the computer 300. During run-time, the shared memory 704 is accessible to the compiled program 304, for example, over a network connected to the computer 300. The trace channel control 708 maintained in the shared memory 704 interacts with the compiled program 304 during execution in order to cause trace information relevant to the dictated trace points and execution occurrences to be captured as the trace channel 706. Of course, as previously mentioned, the trace channel 706 is maintained in the shared memory 704, which may or may not be the same physical memory as maintains the trace channel control 708. The trace channel 706 can have the configuration of the circular buffer trace channel 900.

At any instant, during running of the compiled program 304 or otherwise, the data information of the trace channel 706 can be captured by snapping the information. The snap output 504, controllable by a user, automated, or otherwise, captures and makes available for reporting the information (i.e., at the state of the instant) of the trace channel 706. The snap and reporting are performed in conjunction with the trace database 500 in the method 800.

The reporter 502 communicates with the snap output 504 and the trace database 500, to report trace ids and run-time occurrences at the encounter of the trace points corresponding to the trace ids during execution of the compiled program 304. The database 500 relates the trace information captured from the trace channel 706 to user-readable trace ids and occurrence information, and makes these available via the reporter 502 as output. A user, for example, a developer, an operator of the database 500, another program or application, or other source, can read and use the output report of trace ids and trace information.

In operation of the foregoing systems and the methods, numerous alternative business and technical arrangements are possible. Although only particular devices and elements are specifically identified herein, any other devices and elements, incorporated together or otherwise communicably connected or associated, that perform the same or similar functions or capabilities are also included and covered. In certain embodiments, the shared memory 704 can be centrally located or disparately located, and can be accessible by pluralities of users, devices, nodes, or other features, such as, for example, in the case of networked computers of an enterprise or global network, public or private. Furthermore, combinations of devices and elements, as well as other devices and elements, for communications, processing, storage, and otherwise, including, for example, pluralities of any, certain ones, all, and even additional or alternative devices and elements, and other combinations, are all possible in keeping with the scope of the embodiments herein. Moreover, although the source code described is of a compilable language that involves compiling prior to run-time execution, the same and similar functions and elements are involved in run-time compilable codes, such as Java or others, and can be implemented in accordance with the foregoing.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system comprising:
   a software program including two or more trace points;
   a trace control channel;
   a trace channel; and
   a runtime tracer;
   wherein the trace control channel includes an identification of one or more selected trace points of the two or more trace points;
   wherein the runtime tracer is configured to concurrently execute a first and a second instance of the software program;
   wherein each of the first and second instances of the software program is configured to interact with the trace control channel to save trace information corresponding to the one or more selected trace points in the trace channel.

2. The system as recited in claim 1, wherein the runtime tracer comprises a first computer, wherein the first and second instances of the software program are executed on the first computer.

3. The system as recited in claim 1, wherein the runtime tracer comprises a first and a second computer, wherein the first instance of the software program is executed at the first computer, and the second instance of the software program is executed at the second computer.

4. The system as recited in claim 3, further comprising a shared memory accessible to the first and second computers over a network, wherein the trace channel is included within the shared memory.

5. The system as recited in claim 1, further comprising a first shared memory, wherein the trace channel is included within the first shared memory.

6. The system as recited in claim 5, wherein the trace control channel is included within the first shared memory.

7. The system as recited in claim 5, further comprising a second shared memory, wherein the trace control channel is included within the second shared memory.

8. The system as recited in claim 1, wherein the first instance of the software program corresponds to a first version of the software program, and the second instance of the software program corresponds to a second version of the software program, wherein the second version differs from the first version.

9. The system as recited in claim 1, further including a snap tool configured to create an instantaneous copy of contents of the trace channel.

10. The system as recited in claim 1, wherein contents of the trace control channel are dynamically modified during execution of the first and second instances of the software program by a computer operator.

11. The system as recited in claim 1, wherein the trace control channel is configured using pre-set settings.

12. The system as recited in claim 1, further comprising a relational database comprising two or more entries, wherein each entry of the two or more entries corresponds to a respective trace point of the two or more trace points, wherein each entry of the two or more entries includes human-readable trace information for the respective trace point.

13. The system as recited in claim 12, further comprising a reporter configured to provide a human-readable listing corresponding to an instantaneous snapshot of the trace channel.

14. A method comprising:
    concurrently executing a first and a second instance of a software program including two or more trace points;
    the first instance of the software program interacting with a trace control channel including an identification of one or more selected trace points of the two or more trace points to save trace information corresponding to the one or more selected trace points in a trace channel; and
    the second instance of the software program interacting with the trace control channel to save trace information corresponding to the one or more selected trace points in the trace channel.

15. The method as recited in claim 14, wherein the first instance of the software program is executed on a first computer, and the second instance of the software program is executed on the first computer.

16. The method as recited in claim 14, wherein the first instance of the software program is executed at a first computer, and the second instance of the software program is executed at a second computer.

17. The method as recited in claim 16, wherein the trace channel is included within a shared memory accessible to the first and second computers over a network.

18. The method as recited in claim 14, wherein the trace channel is included within a first shared memory.

19. The method as recited in claim 18, wherein the trace control channel is included within the first shared memory.

20. The method as recited in claim 18, wherein the trace control channel is included within a second shared memory.

21. The method as recited in claim 14, wherein the first instance of the software program corresponds to a first version of the software program, and the second instance of the software program corresponds to a second version of the software program, wherein the second version differs from the first version.

22. The method as recited in claim 14, further comprising:

creating an instantaneous copy of contents of the trace channel.

23. The method as recited in claim 14, further comprising:

dynamically modifying contents of the trace channel control during execution of the first and second instances of the software program.

24. The method as recited in claim 14, further comprising:

configuring the trace control channel using pre-set settings.

25. The method as recited in claim 14, further comprising:

storing two or more entries in a relational database, wherein each entry of the two or more entries corresponds to a respective trace point of the two or more trace points, and wherein each entry of the two or more entries includes human-readable trace information for the respective trace point.

26. The method as recited in claim 25, further comprising:

providing a human-readable listing corresponding to an instantaneous snapshot of the trace channel.

* * * * *